(12) United States Patent
Brady

(10) Patent No.: US 6,561,588 B1
(45) Date of Patent: May 13, 2003

(54) CAR SEAT FOOTREST WITH STORAGE POCKETS

(76) Inventor: Andrea R. Brady, 121 Bradford Dr., Milford, OH (US) 45150

( * ) Notice: Subject to any disclaimer, the term of this patent is extended or adjusted under 35 U.S.C. 154(b) by 0 days.

(21) Appl. No.: 09/816,008

(22) Filed: Mar. 22, 2001

Related U.S. Application Data

(60) Provisional application No. 60/265,949, filed on Feb. 1, 2001.

(51) Int. Cl.$^7$ ............................ A47C 31/11; A47C 16/02
(52) U.S. Cl. ............................. 297/423.4; 297/219.12; 297/228.1; 297/188.01; 297/188.2
(58) Field of Search ........................ 297/423.4, 423.39, 297/219.12, 225, 228.1, 229, 188.01, 188.14, 188.2

(56) References Cited

U.S. PATENT DOCUMENTS

| | | | | |
|---|---|---|---|---|
| 4,883,701 A | * | 11/1989 | Rankin et al. ...... | 297/219.12 X |
| 4,885,200 A | * | 12/1989 | Perdelwitz, Jr. et al. ............... | 297/219.12 X |
| 4,891,454 A | * | 1/1990 | Perdelwitz, Jr. et al. | |
| 5,228,745 A | * | 7/1993 | Hazel ................. | 297/219.12 X |
| 5,275,463 A | * | 1/1994 | Rocha ................ | 297/188.01 X |
| 5,482,352 A | * | 1/1996 | Leal et al. .......... | 297/188.01 X |
| 5,549,353 A | * | 8/1996 | Gaudet et al. ...... | 297/219.12 X |
| 5,582,458 A | * | 12/1996 | Wildt ................. | 297/188.01 X |
| 5,620,229 A | * | 4/1997 | Ledford ............. | 297/188.01 X |
| 5,950,261 A | * | 9/1999 | Hay et al. ........... | 297/219.12 X |
| 5,954,404 A | * | 9/1999 | Suzuki ............... | 297/219.12 X |
| 6,155,637 A | * | 12/2000 | Waters .............. | 297/188.01 X |
| 6,237,996 B1 | * | 5/2001 | Chen et al. ......... | 297/423.4 X |

* cited by examiner

*Primary Examiner*—Rodney B. White
(74) *Attorney, Agent, or Firm*—Carol D. Titus; James J. Leary

(57) ABSTRACT

A child's car seat accessory with a footrest and/or storage pockets. The combined footrest and pocket version is made of cloth in a T shape. The middle of the top of the T fits in the seat of the car seat, with an opening to allow the fastening mechanism to pass through. To the right and left sides are the storage pockets, which hang over each side of the car seat. The pockets can be elasticized on the outside to allow for greater storage and to hold items in the pockets. The bottom of the T has a foam footrest covered with the same cloth. Above the foam piece on both edges are snaps to allow the length of the foam to be adjusted to the child's leg length. The pocket accessory version is formed of a generally rectangular piece of cloth with a seat portion in the middle and the two opposite ends having pockets extending over each side of the car seat. The footrest accessory version is formed of a generally rectangular piece of cloth with a seat portion at one end and the footrest at the opposite end. The middle portion is used to allow the user to adjust the height of the footrest.

21 Claims, 6 Drawing Sheets

CAR SEAT FOOTREST WITH STORAGE POCKETS

CROSS REFERENCE TO OTHER APPLICATIONS

This application claims the benefit of US Provisional Patent Application Number 60/265,949, filed Feb. 1, 2001.

FIELD OF THE INVENTION

The present invention relates to an accessory for a forward-facing child's car seat. In particular, it relates to a soft footrest for the child's feet, combined with storage pockets for toys, books, drinks, etc., which hang over the side of the car seat.

BACKGROUND OF THE INVENTION

When a child sits in a forward-facing car seat, his/her feet generally have no place to rest and thus hang down over the edge of the seat. This can be extremely uncomfortable for the child, and can actually cause back, hip and leg problems as the weight of the child's legs, and the position the child assumes to alleviate the discomfort, pulls the spine, joints, ligaments and muscles out of alignment.

In addition, it is often frustrating for a child—and the driver—when toys, books, drinks, etc., are not readily available. The child may cry for something and the driver will hunt for the item, then turn and hand it to the child while the car is in motion. Not only is this frustrating, it can be dangerous since the driver's focus is on finding and getting the item to the child, and is thus not fully on the road.

When a child's forward-facing car seat is installed in a car, it is extremely important that it is fastened against the seat as tightly as possible. Car seat manufacturers and safety precautions stress that the seat should not be able to move more than one inch in any direction in order to maintain safety of the child in the seat. Thus, it is very difficult to place an item under the seat and still fasten it in properly.

What is needed to solve the above problems is a product that provides support for the child's feet and easily accessible storage for desired items. In order to allow for safe usage, this should be accomplished without interfering with the safe functioning of the car seat.

SUMMARY OF THE INVENTION

The present invention provides a child's car seat accessory with a footrest and/or storage pockets. The accessory can be used in a forward-facing child's car seat and does not interfere with the proper fastening of the child's car seat to the automobiles seat. The combined footrest and pocket version is made of cloth in a T shape. The middle of the top of the T fits in the seat of the child's car seat, with an opening to allow the fastening mechanism to pass through. To the right and left sides are the storage pockets, which hang over each side of the car seat. The pockets can be elasticized on the outside to allow for greater storage and to hold items in the pockets. The bottom of the T has a triangular-shaped piece of foam, covered with the same cloth forming a footrest for the child's feet. Above the footrest, on both edges, are snaps to allow the height of the footrest to be adjusted to the child's leg length, and to be extended as the child grows.

A second version of the accessory is formed of a generally rectangular piece of cloth with a seat portion in the middle and the two opposite ends having pockets extending over each side of the car seat.

A third version of the accessory is formed of a generally rectangular piece of cloth with a seat portion at one end and the footrest at the opposite end. The middle portion has height adjustment connectors allow the user to adjust the height of the footrest.

The accessory is placed in the child's car seat before the child sits in the seat, with the buckle to fasten the straps passing through the opening in the seat portion. The child then sits on top of the invention, and the child's weight holds it in place. Since the weight of the child is directly proportional to the amount of force placed on the foam footrest portion, the child's weight will always be sufficient to hold the seat portion in place. In addition, since it is placed on the car seat after the seat has already been fastened into the car, the accessory does not interfere with proper fastening and installation.

The accessory may be made of any sort of flexible material. It may be stain-proofed or water-proofed, if desired. Although other materials may be used, the material is preferably hypoallergenic and flame-retardant to meet government standards. The snaps may be replaced with hook-and-loop material, hooks, or any other sort of fastening mechanism that will hold the pressure placed on the foam footrest by the child's legs.

Any other method of attaching the foam triangular footrest piece to the cloth piece, such as pockets in the cloth piece into which the foam piece fits, fasteners to attach the foam piece to the cloth piece, such as hook-and-loop material, snaps, hooks, etc., or other methods of attaching a soft triangular or rectangular piece to the cloth piece, are also acceptable variations of the invention.

The item may be used in a child's car seat or on the actual seat of the automobile for a child who has outgrown the car seat but whose legs do not yet reach the floor of the automobile. In the last situation, the storage pockets lay flat on the seat next to the child.

DETAILED DESCRIPTION OF THE INVENTION

Figure 1:
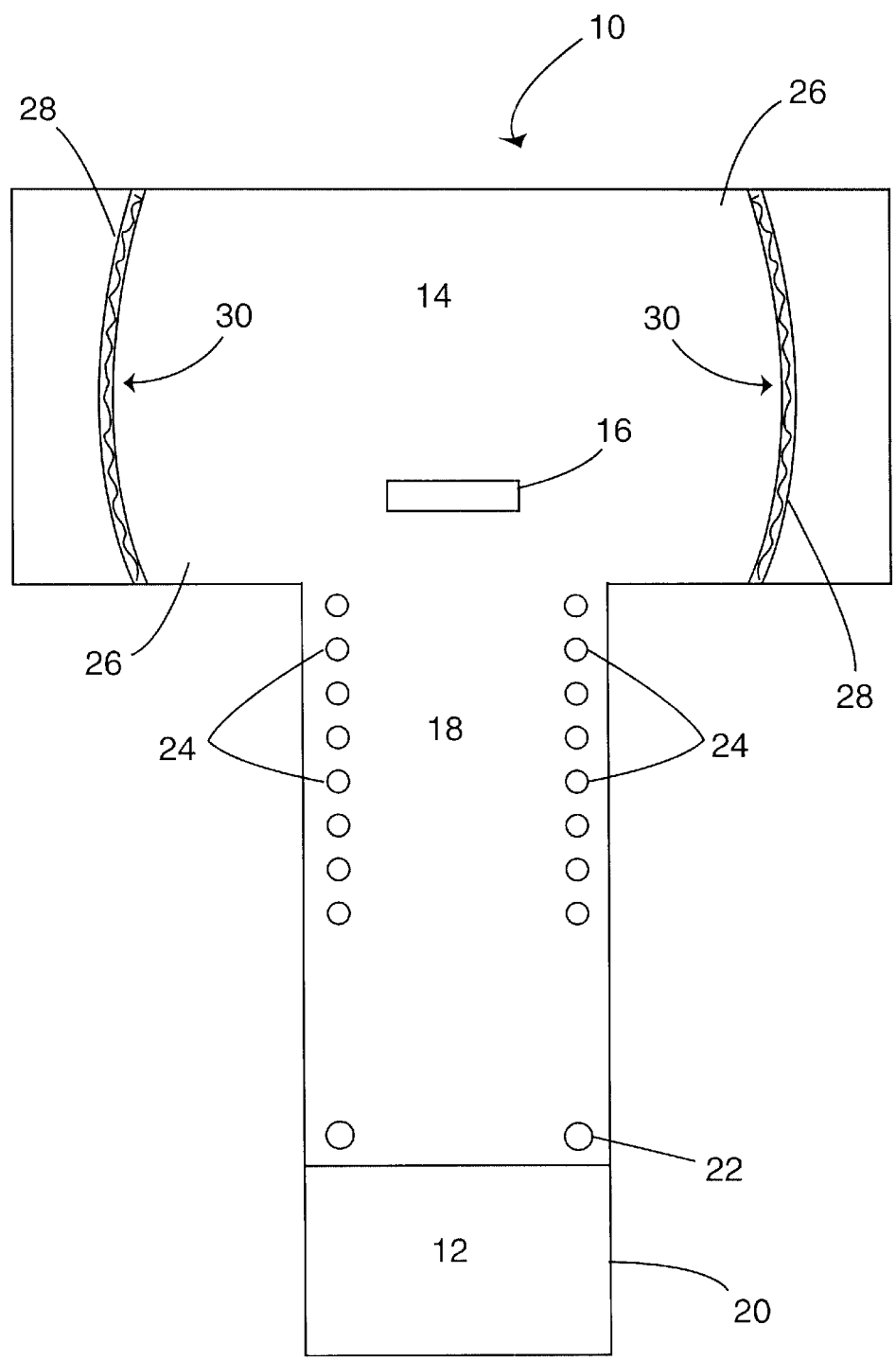
FIG. 1 shows a top view of the footrest and pocket accessory in a flat position.
Figure 2:
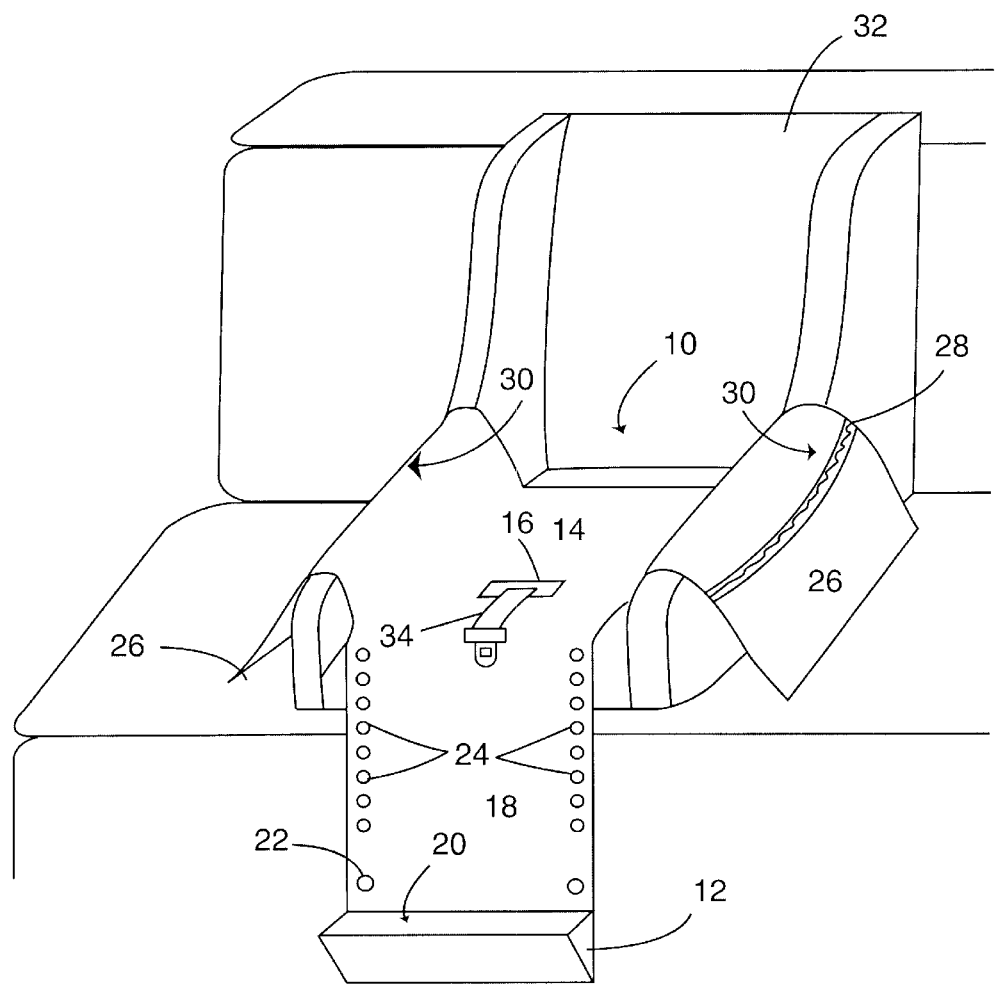
FIG. 2 shows the accessory installed in the child's car seat.

FIG. 1 shows a top view of the footrest and pocket accessory 10 in a flat position. FIG. 2 shows the accessory 10 installed in the child's car seat 32. The accessory 10 has a seat portion 14 that fits in the seat of the child's car seat 32, prior to the child sitting in the seat 32. The seat portion 14 has an opening 16 that allows the fastening mechanism 34 of the car seat 32 to pass through.

The bottom extension 18 of the accessory 10 extends from the seat portion 14 down toward the floor of the automobile. At the end of the bottom extension 18 is a closed pocket 20 holding the footrest 12. The footrest 12 may be any shape with a top surface suitable for resting a child's foot. Preferred shapes include triangular, square, rectangular or even oval or round. In FIG. 1, the footrest 12 is triangular and completely covered by the material of the closed pocket 20.

On both the left and right sides of the bottom extension 18 are fastenings 22, 24 to adjust the length of the bottom extension 18 to the length of the child's legs. In the embodiment shown, the male portion 22 of the snap fastening is at the bottom of the extension 18, just above the closed pocket 20/foam footrest 12. Female portions 24 of the snap fastening are spread on the upper portion of the bottom extension 18.

The side extensions 26 of the accessory 10 extend from the seat portion 14 out to both the left and right sides. These extensions 26 end in pockets 30 on both sides. The front of the pocket 30 may have an elastic band 28 to assist in holding one or more items within the pocket 30. The side extensions 26 fold over each side of the car seat 32, hanging down next to the car seat 32 where the child can reach them easily.

Figure 3:
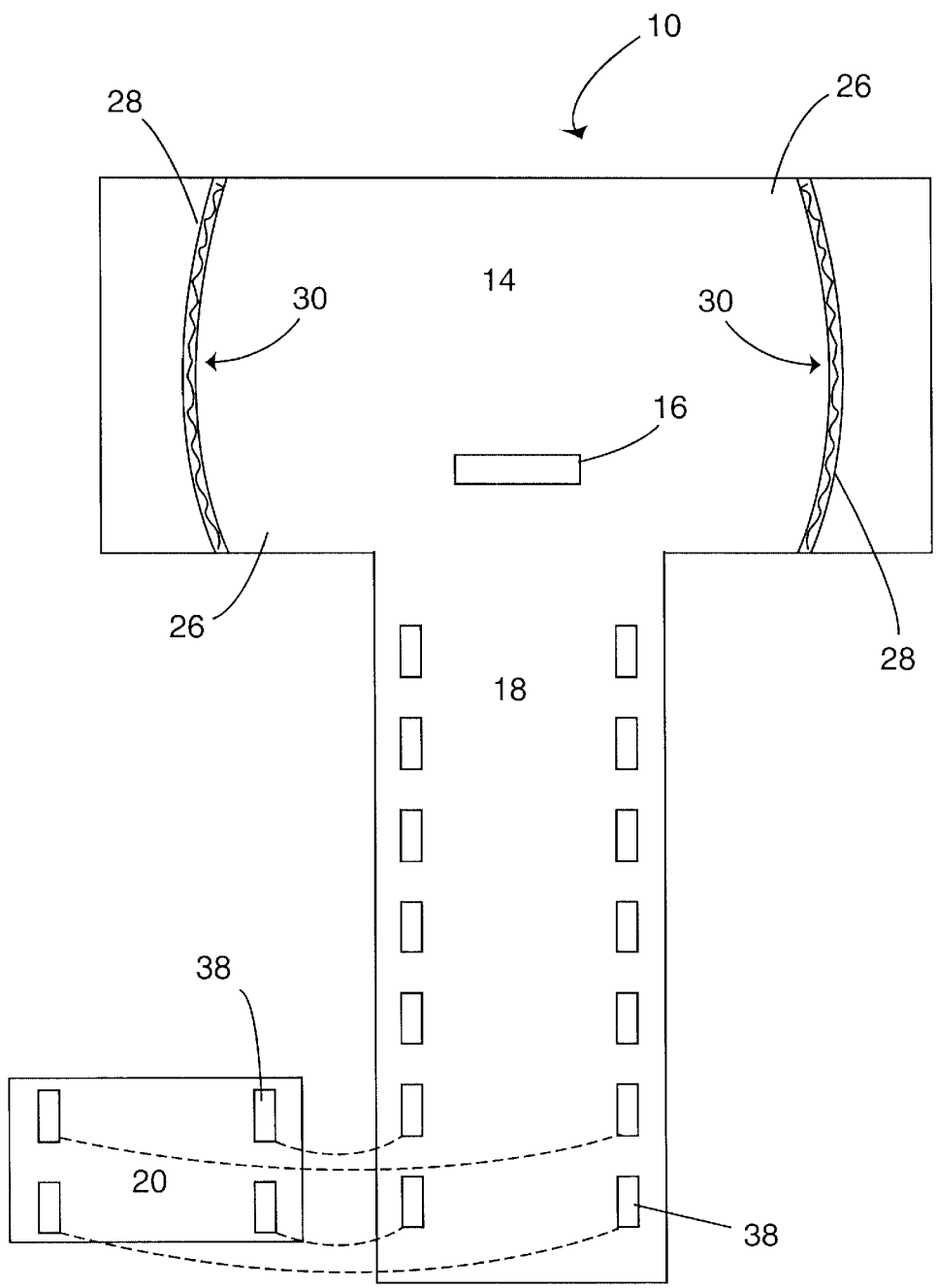
FIG. 3 and FIG. 4 show two alternate ways to attach the footrest to the material extension.
Figure 4:
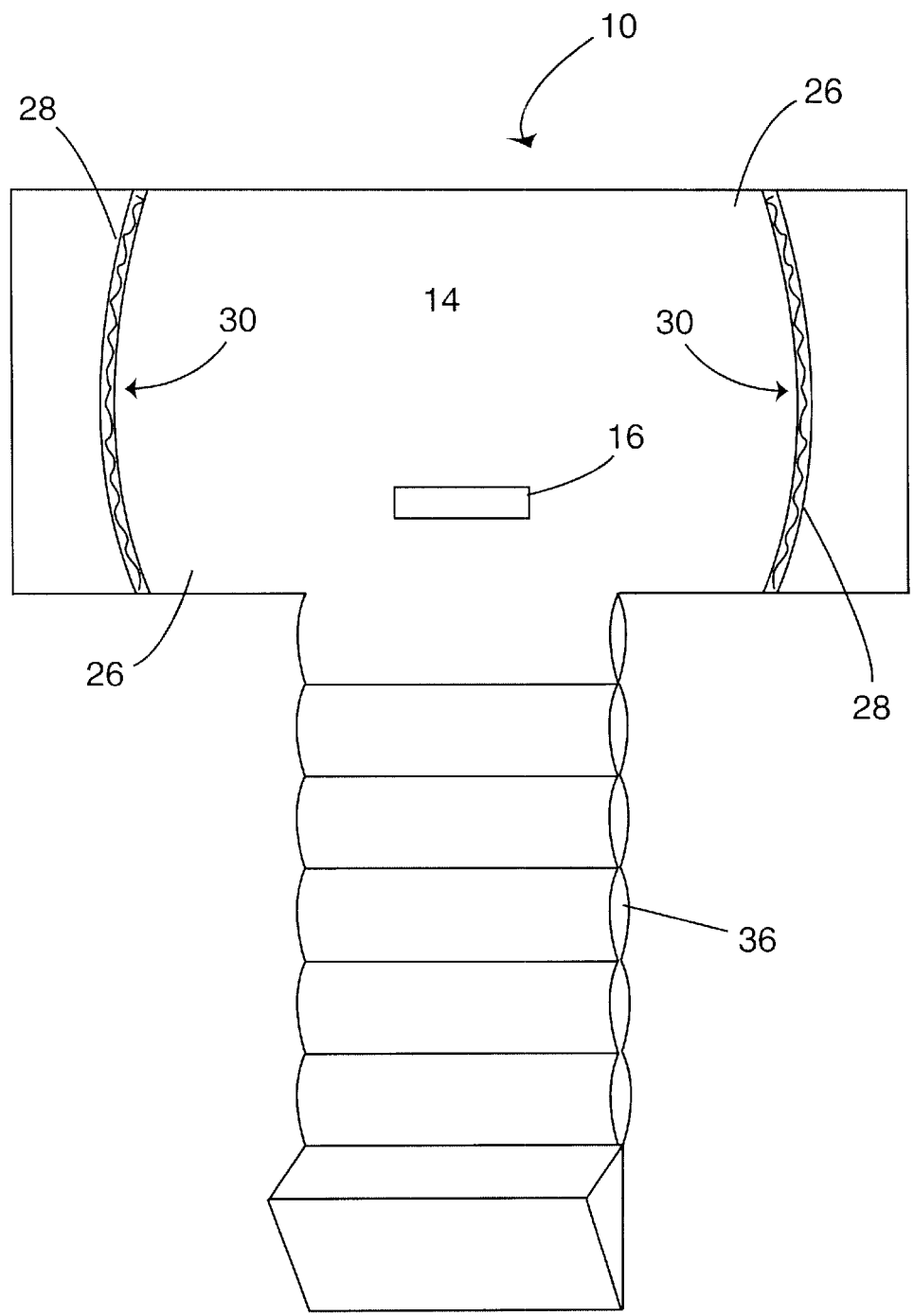

The fastenings 22, 24 for adjusting the length of the bottom extension 18 may also take other forms. For example, FIG. 3 shows a footrest 12 connected with hook-and-loop material 38. The footrest is turned 180 degrees and the mating pieces of hook-and-loop material are pressed together. The hook-and-loop material 38 may be in patches, as shown, or a strip of material 38 may run along the edge of the bottom extension 18. Optimally, the loop portion of the material 38 would be on the bottom extension 18 to reduce the likelihood of other items catching on the material 38. The hook material may also be on the side of the footrest 12, in which case, the edges of the bottom extension 18 would wrap around the edge of the footrest 12. Another alternative has pockets 36 within the bottom extension 18, which may be filled with a soft material to shorten the length of the bottom extension 18, as shown in FIG. 4. Other alternatives include buttons, hooks or any other method of fastening the cloth to adjust the length of the extension 18 or attachment to adjust the height at which the footrest is located.

Figure 5:
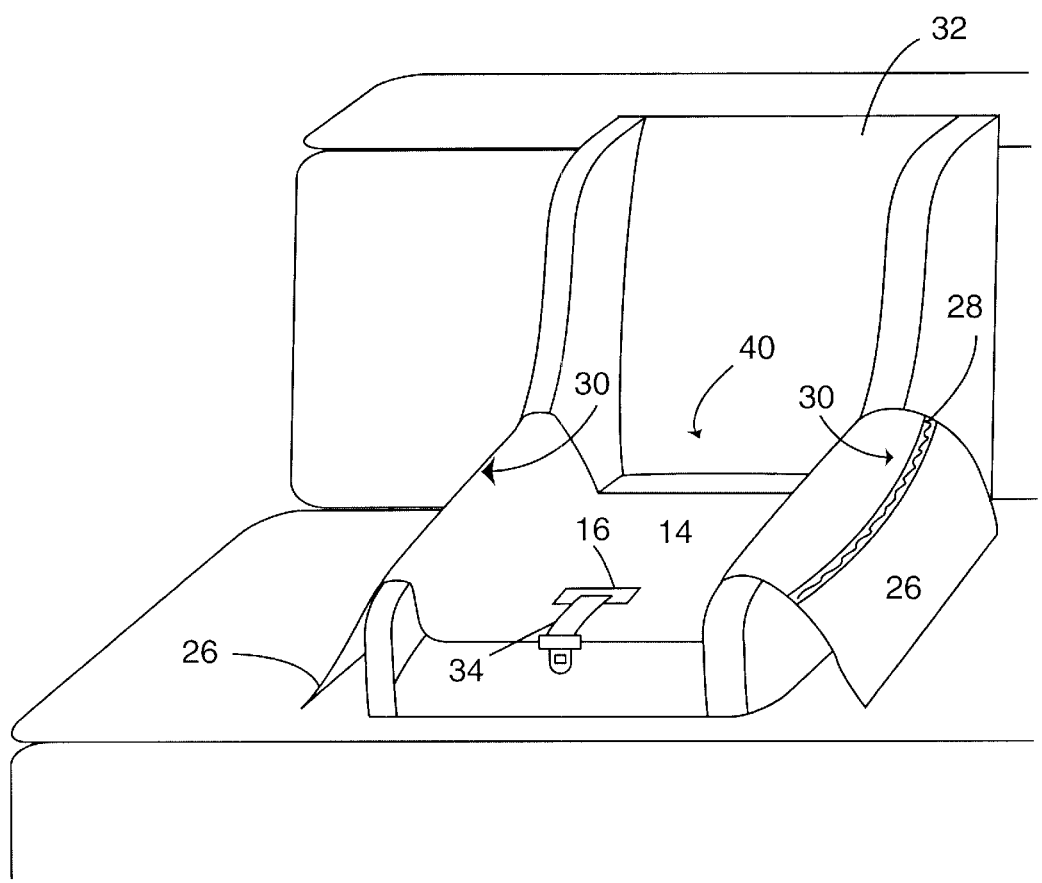
FIG. 5 shows a pocket accessory for a car seat installed on a car seat.

FIG. 5 shows a pocket accessory 40 installed on a car seat 32. The accessory 10 has a seat portion 14 that fits in the seat of the child's car seat 32, prior to the child sitting in the seat 32. The seat portion 14 has an opening 16 that allows the fastening mechanism 34 of the car seat 32 to pass through. Side extensions 26 extend out to both the left and right sides from the seat portion 14 of the accessory 10. These extensions 16 end in pockets 30 on both sides. The front of the pocket 30 may have an elastic band 28 to assist in holding one or more items within the pocket 30. The side extensions 26 fold over each side of the car seat 32, hanging down next to the car seat 32 where the child can reach them easily.

Figure 6:
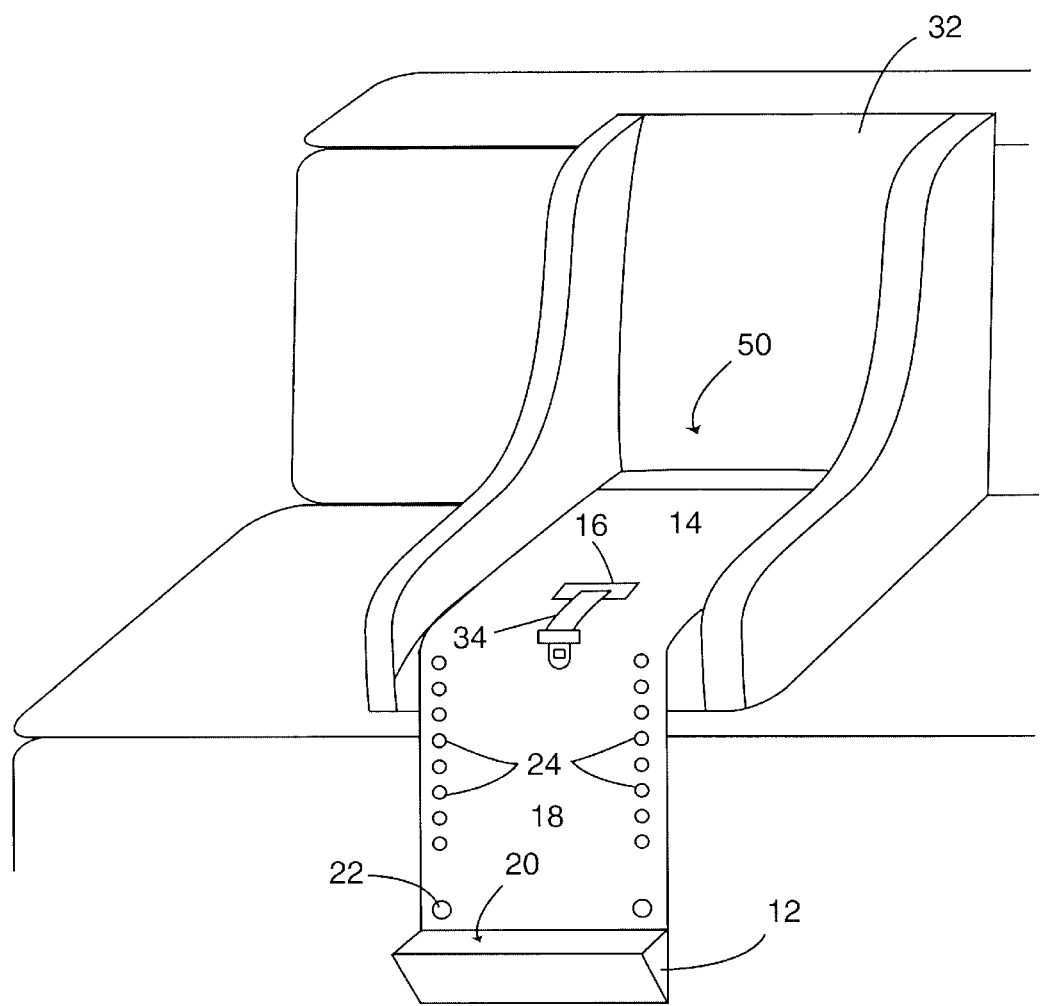
FIG. 6 shows a footrest embodiment installed in a car seat.

FIG. 6 shows a footrest accessory 50 for a car seat 32. The accessory 10 has a seat portion 14 that fits in the seat of the child's car seat 32, prior to the child sitting in the seat 32. The seat portion 14 has an opening 16 that allows the fastening mechanism 34 of the car seat 32 to pass through. A bottom extension 18 extends from the seat portion 14 down toward the floor of the automobile. At the end of the bottom extension 18 is a closed pocket 20 holding the footrest 12. The footrest 12 may be any shape with a top surface suitable for resting a child's foot, as indicated in the discussion of FIG. 1. Also, as previously mentioned, other attachment and adjustment mechanisms may also be used.

The configuration of the accessory 10 allows it to be placed in the child's car seat 32 before the child is in the seat 32, with the bottom extension 18, if present, hanging down toward the automobile floor, and the side extensions 26, if present, folding over the left and right sides of the car seat 32 and hanging down. The car seat buckling mechanism 34 extends through the hole 16 in the seat portion 14. The child then sits on top of the seat portion 14, holding it in place. The bottom extension 18, if present, is then adjusted to the length of the child's legs and fastened into place via the fasteners 22, 24. Because the invention goes on top of the car seat 32, it does not interfere with the proper functioning of the seat 32. When the child is not in the seat 32, the accessory 10 stays in place, ready to be used again.

Although other materials may be used, the accessory 10 is preferably made of a washable fabric, hypoallergenic and flame-retardant to meet government standards. Fabric can be woven, non-woven or knitted, and is preferably non-stretchy. Cotton/polyester blends are particularly suitable for construction of the invention. The footrest portion 12 is made of foam or other soft material that may be cut into any suitable shape. The invention may be constructed using known fabrication methods, such as sewing, adhesive bonding, heat welding, ultrasonic welding, or the like.

The accessory may also be used on the actual seat of the automobile for a child who has outgrown the car seat but whose legs do not yet reach the floor of the automobile. In this case, the hole 16 for the seatbelt 34 may be omitted and the storage pockets lay flat on the seat next to the child.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of only one possible embodiment of the invention. Other embodiments and modifications will, no doubt, occur to those skilled in the art. For example, the embodiments show have two pockets, one extending to each side of the car seat. Alternate embodiments may have only a single pocket extending to one side. Thus, the examples given should only be interpreted as illustrations of some of the preferred embodiments of the invention, and the full scope of the invention should be determined by the appended claims and their legal equivalents.

I claim:

1. A car seat accessory for use with a child's car seat, the accessory comprising:
    a sheet of flexible material, having an opening extending therethrough, said opening sized and configured to allow a seatbelt strap of the child's car seat to extend therethrough,
    a footrest located adjacent an end of said sheet of said flexible material,
    and a plurality of length adjustment means for adjusting the location of said footrest with respect to said sheet of material.

2. The car seat accessory of claim 1, wherein said footrest is formed of a foam material.

3. The car seat accessory of claim 1, wherein said footrest is triangular.

4. The car seat accessory of claim 1, wherein said footrest is rectangular.

5. The car seat accessory of claim 1, wherein a top surface of said footrest is generally flat.

6. The car seat accessory of claim 1, wherein said material is non-elastic.

7. A car seat accessory for use with a child's car seat, the accessory comprising:
    a sheet of flexible material, having an opening extending therethrough, said opening sized and configured to allow a seatbelt strap of the child's car seat to extend therethrough, a footrest located adjacent an end of said sheet of said flexible material, and a plurality of length adjustment connectors attached to said material.

8. The car seat accessory of claim 7, wherein said connectors are chosen from the group of connectors consisting of snaps, hook-and-loop material and hooks.

9. A child's car seat accessory, the accessory comprising:

a T-shaped piece of flexible material, having a first leg, a second leg and a third leg, said third leg extending generally perpendicular to said first and second legs, a cushion located adjacent an end of said third leg, a first pocket located on said first leg, and a second pocket located on said second leg.

10. The car seat accessory of claim 9, further comprising an opening extending therethrough, said opening sized and configured to allow a seatbelt strap of the child's car seat to extend therethrough.

11. The car seat accessory of claim 9, wherein said cushion is formed of a foam material.

12. The car seat accessory of claim 9, wherein said cushion is triangular.

13. The car seat accessory of claim 9, wherein said cushion is rectangular.

14. The car seat accessory of claim 9, wherein said material is non-elastic.

15. The car seat accessory of claim 9, further comprising a plurality of length adjustment connectors attached to said material.

16. The car seat accessory of claim 15, wherein said connectors are chosen from the group of connectors consisting of snaps, hook-and-loop material and hooks.

17. The car seat accessory of claim 9, wherein said first pocket has elastic around an opening extending therein.

18. A child's car seat accessory, the accessory comprising:

a T-shaped piece of non-elastic, flexible material, having a first leg, a second leg, a third leg and an opening extending therethrough, said opening sized and configured to allow a seatbelt strap of the child's car seat to extend therethrough, said third leg extending generally perpendicular to said first and second legs, a foam cushion located adjacent an end of said third leg, said foam cushion having a generally flat top surface, a first pocket located on said first leg, a second pocket located on said second leg, and a plurality of length adjustment connectors attached to said third leg.

19. The car seat accessory of claim 18, wherein said cushion is triangular.

20. The car seat accessory of claim 18, wherein said cushion is rectangular.

21. The car seat accessory of claim 18, wherein said first and second pockets have elastic around openings extending therein.

* * * * *